(12) United States Patent
Hannah et al.

(10) Patent No.: US 9,922,732 B2
(45) Date of Patent: Mar. 20, 2018

(54) MODERATING FUEL RODS INCLUDING METAL HYDRIDE AND METHODS OF MODERATING FUEL BUNDLES OF BOILING WATER REACTORS USING THE SAME

(71) Applicants: John Christopher Hannah, Wilmington, NC (US); Gerald Dean Kvaall, Jr., Wilmington, NC (US)

(72) Inventors: John Christopher Hannah, Wilmington, NC (US); Gerald Dean Kvaall, Jr., Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 867 days.

(21) Appl. No.: 14/508,029

(22) Filed: Oct. 7, 2014

(65) Prior Publication Data

US 2016/0099081 A1 Apr. 7, 2016

(51) Int. Cl.
*G21C 3/326* (2006.01)
*G21C 5/02* (2006.01)
*G21C 3/04* (2006.01)
*G21C 5/12* (2006.01)

(52) U.S. Cl.
CPC .............. *G21C 5/02* (2013.01); *G21C 3/04* (2013.01); *G21C 3/326* (2013.01); *G21C 5/12* (2013.01); *Y02E 30/31* (2013.01); *Y02E 30/38* (2013.01)

(58) Field of Classification Search
CPC ... G21C 5/02; G21C 5/12; G21C 5/14; G21C 5/16; G21C 5/18; G21C 3/04; G21C 3/326; G21C 2003/3225
USPC ......................................................... 376/458
See application file for complete search history.

(56) References Cited

U.S. PATENT DOCUMENTS

| 4,591,479 | A |   | 5/1986 | Weitzberg |            |
|-----------|---|---|--------|-----------|------------|
| 4,926,450 | A | * | 5/1990 | Masuhara  | G21C 3/322 |
|           |   |   |        |           | 376/444    |
| 5,149,495 | A | * | 9/1992 | Elkins    | G21C 3/322 |
|           |   |   |        |           | 376/444    |
| 5,349,618 | A | * | 9/1994 | Greenspan | G21C 3/326 |
|           |   |   |        |           | 252/636    |
| 5,349,619 | A | * | 9/1994 | Mochida   | G21C 3/322 |
|           |   |   |        |           | 376/435    |
| 2007/0133734 | A1 | * | 6/2007 | Fawcett | G21C 1/303 |
|           |   |   |        |           | 376/438    |

\* cited by examiner

*Primary Examiner* — Sharon M Davis
(74) *Attorney, Agent, or Firm* — Harness, Dickey & Pierce, P.L.C.

(57) ABSTRACT

A moderating fuel rod for a boiling water reactor may include a nuclear fuel section; a neutron moderator section including a metal hydride; and a threaded connector joining the nuclear fuel section and the neutron moderator section. By including one or more moderating fuel rods in a fuel bundle, the neutron moderation within the fuel bundle may be improved, thereby allowing energy to be more efficiently extracted from the entire length of the fuel bundle.

8 Claims, 6 Drawing Sheets

MODERATING FUEL RODS INCLUDING METAL HYDRIDE AND METHODS OF MODERATING FUEL BUNDLES OF BOILING WATER REACTORS USING THE SAME

BACKGROUND

Field

The present disclosure relates to the moderation of neutrons in a nuclear reactor.

Description of Related Art

Conventionally, fast neutrons are produced by fission reactions in a nuclear reactor. A fast neutron is a free neutron with a kinetic energy level of about 1 MeV or more. Moderation is the process of reducing the initial high kinetic energy of the fast neutrons so as to convert the fast neutrons to lower-energy thermal neutrons. Thermal neutrons help sustain the chain of fission reactions in the core.

In a conventional nuclear power plant, water has been used as a neutron moderator to slow down (thermalize) the fast neutrons, with the water flowing upwardly through the fuel bundles. However, conventional fuel bundles operate with axially varying amounts of moderation in their active fuel region due to the eventual boiling of the water along the upper portions of the fuel length. In particular, the upper boiling regions have a reduced moderating capability relative to the lower non-boiling regions of the fuel bundles. As a result, there are more fission reactions and, thus, more power generated in the lower non-boiling regions than in the upper boiling regions of the fuel bundles, thereby creating a non-uniform axial power shape.

A non-uniform axial power shape can limit the overall reactor power generation based on the locations of the power peaks and the design limitations of those locations. Additionally, the non-uniform axial power shape can cause the fuel in the bottom of the fuel bundles to be consumed at a faster rate than the fuel in the top of the fuel bundles. Consequently, when the lower sections of the fuel bundles burn out, a large portion of the fuel in the upper sections of the fuel bundles may still remain unburned, resulting in poor fuel utilization. Furthermore, poor neutron moderation in the upper sections of the fuel bundles results in increased fast neutron irradiation. Accordingly, various structures within a nuclear reactor may be degraded over time by the fast neutron irradiation, thereby shortening the life of those components and requiring mitigating action to continue operation of the nuclear power plant.

SUMMARY

A moderating fuel rod for a boiling water reactor may include a nuclear fuel section; a neutron moderator section including a metal hydride; and a threaded connector joining the nuclear fuel section and the neutron moderator section.

A method of moderating a fuel bundle of a boiling water reactor may include inserting at least one moderating fuel rod into the fuel bundle. The at least one moderating fuel rod may include a nuclear fuel section, a neutron moderator section including a metal hydride, and a threaded connector joining the nuclear fuel section and the neutron moderator section.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
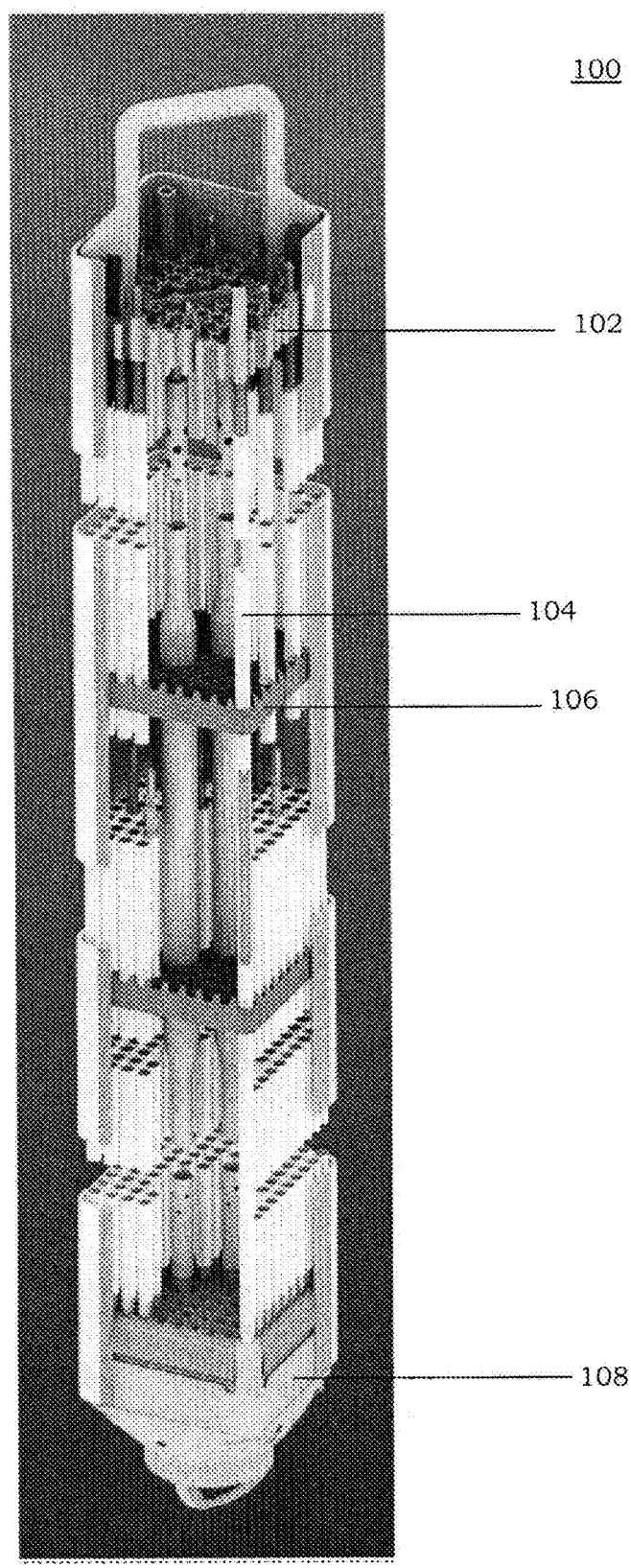
FIG. 1 is a cut-away view of a fuel bundle of a boiling water reactor according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a cut-away view of a fuel bundle of a boiling water reactor according to an example embodiment. Referring to FIG. 1, the fuel bundle 100 includes a plurality of fuel rods 104 positioned between an upper tie plate 102 and a lower tie plate 108. The plurality of fuel rods 104 are arranged in an array and extend through one or more spacer grids 106, which provide lateral support to the plurality of fuel rods 104. In particular, the spacer grid 106 helps to maintain the proper spacing between the array of fuel rods 104 while also reducing or preventing flow-induced vibrations. The plurality of fuel rods 104 may be full-length fuel rods or part-length fuel rods. Additionally, the part-length fuel rods can be further categorized as long part-length rods or short part-length rods. As discussed in more detail herein, one or more of the plurality of fuel rods 104 can be converted into moderating fuel rods to improve the neutron moderation within the fuel bundle 100.

Figure 2:
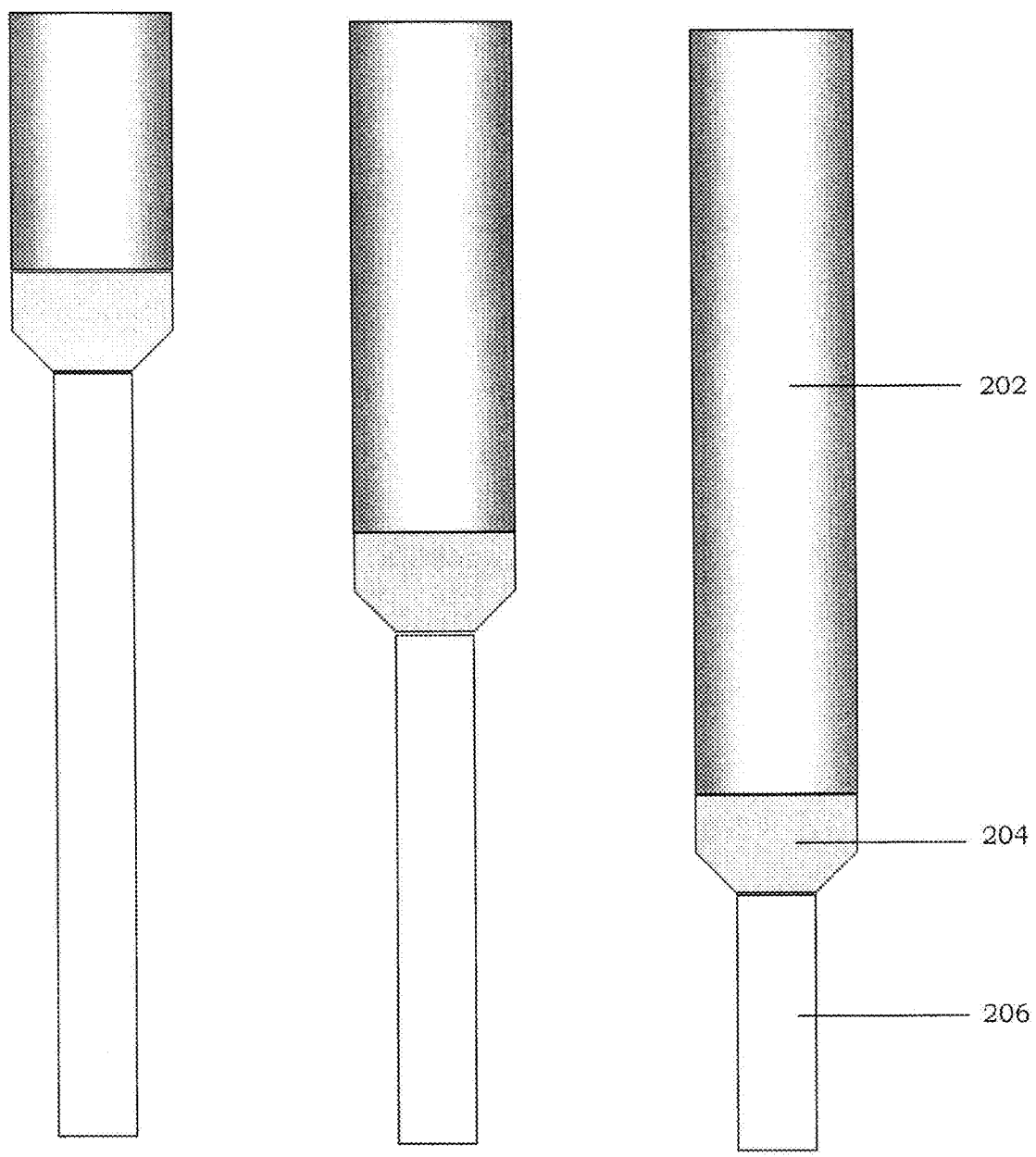
FIG. 2 is a schematic view of moderating fuel rods for a fuel bundle of a boiling water reactor according to an example embodiment.

FIG. 2 is a schematic view of moderating fuel rods for a fuel bundle of a boiling water reactor according to an example embodiment. Referring to FIG. 2, each of the moderating fuel rods 200 includes a neutron moderator section 202, a nuclear fuel section 206, and a threaded connector 204 joining the neutron moderator section 202 and the nuclear fuel section 206. The nuclear fuel section 206 may include uranium dioxide. The neutron moderator section 202 includes a metal hydride as a moderator material. The metal hydride may be a transition metal hydride. Additionally, the transition metal hydride may be a Group 4 metal hydride. For instance, the Group 4 metal hydride may be at least one of zirconium hydride and titanium hydride.

As shown in FIG. 2, an average diameter of the neutron moderator section 202 is greater than an average diameter of the nuclear fuel section 206. As a result, the threaded connector 204 has a portion that tapers downward from the neutron moderator section 202 toward the nuclear fuel section 206. However, it should be understood that, in other non-limiting embodiments, the average diameter of the neutron moderator section may be equal to (e.g., FIG. 3) or less than (e.g., FIG. 4) the average diameter of the nuclear fuel section depending on the location of the moderating fuel rod within the fuel bundle. The fuel bundle may be as shown and described in connection with the fuel bundle 100 in FIG. 1. In addition to the variable average diameter, the lengths of the neutron moderator section 202 and the nuclear fuel section 206 may also differ depending on the location of the moderating fuel rod 200 within the fuel bundle. For instance, in the left moderating fuel rod 200 in FIG. 2, the neutron moderator section 202 is shorter than the nuclear fuel section 206. In the center moderating fuel rod 200 in FIG. 2, the neutron moderator section 202 is about equal in length to the nuclear fuel section 206. In the right moderating fuel rod 200 in FIG. 2, the neutron moderator section 202 is longer than the nuclear fuel section 206.

Although three different configurations for the moderating fuel rod 200 are shown in FIG. 2, it should be understood that more variations are possible, and a fuel bundle can include one or more quantities and configurations of the moderating fuel rods 200 depending on the moderation goals/requirements. Furthermore, although the moderating fuel rods 200 in FIG. 2 are shown with the neutron moderator section 202 being above the nuclear fuel section 206, it should be understood that the neutron moderator section 202 can also be positioned below the nuclear fuel section 206 depending on the moderation goals/requirements of a specific case.

Figure 3:
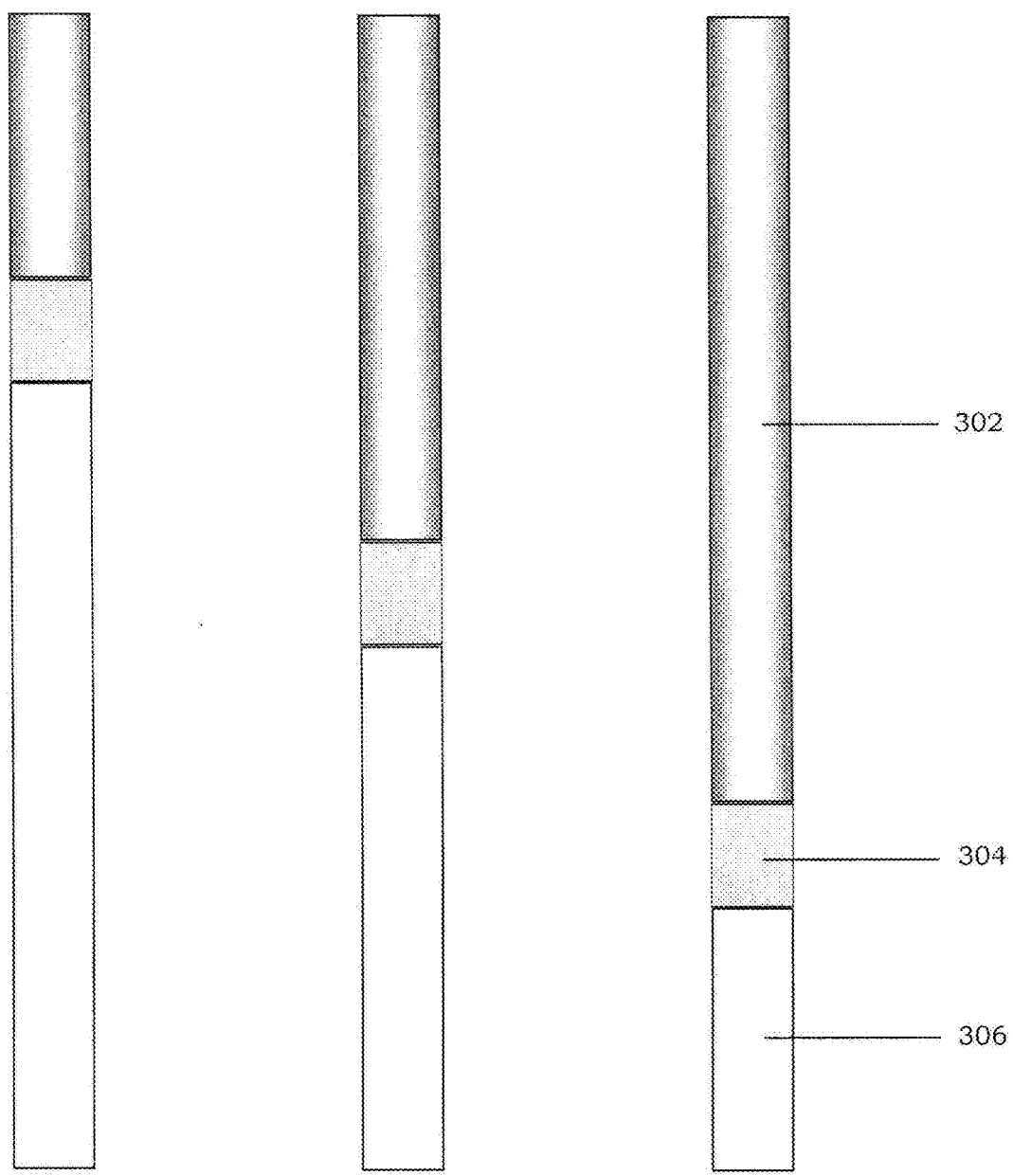
FIG. 3 is a schematic view of moderating fuel rods for a fuel bundle of a boiling water reactor according to another example embodiment.

FIG. 3 is a schematic view of moderating fuel rods for a fuel bundle of a boiling water reactor according to another example embodiment. Referring to FIG. 3, each of the moderating fuel rods 300 includes a neutron moderator section 302, a nuclear fuel section 306, and a threaded connector 304 joining the neutron moderator section 302 and the nuclear fuel section 306. As shown in FIG. 3, an average diameter of the neutron moderator section 302 is about equal to an average diameter of the nuclear fuel section 306. As a result, an average diameter of the visible portion of the threaded connector 304 is also about equal to the average diameters of the neutron moderator section 302 and the nuclear fuel section 306. Alternatively, as discussed herein, the neutron moderator section 302 may have an average diameter that differs from an average diameter of the nuclear fuel section 306. The features of the moderating fuel rods 300 of FIG. 3 that correspond to the features of the moderating fuel rods 200 of FIG. 2 (along with the applicable properties, variations, and considerations) may be as described above and, thus, have not been repeated in the interest of brevity.

Figure 4:
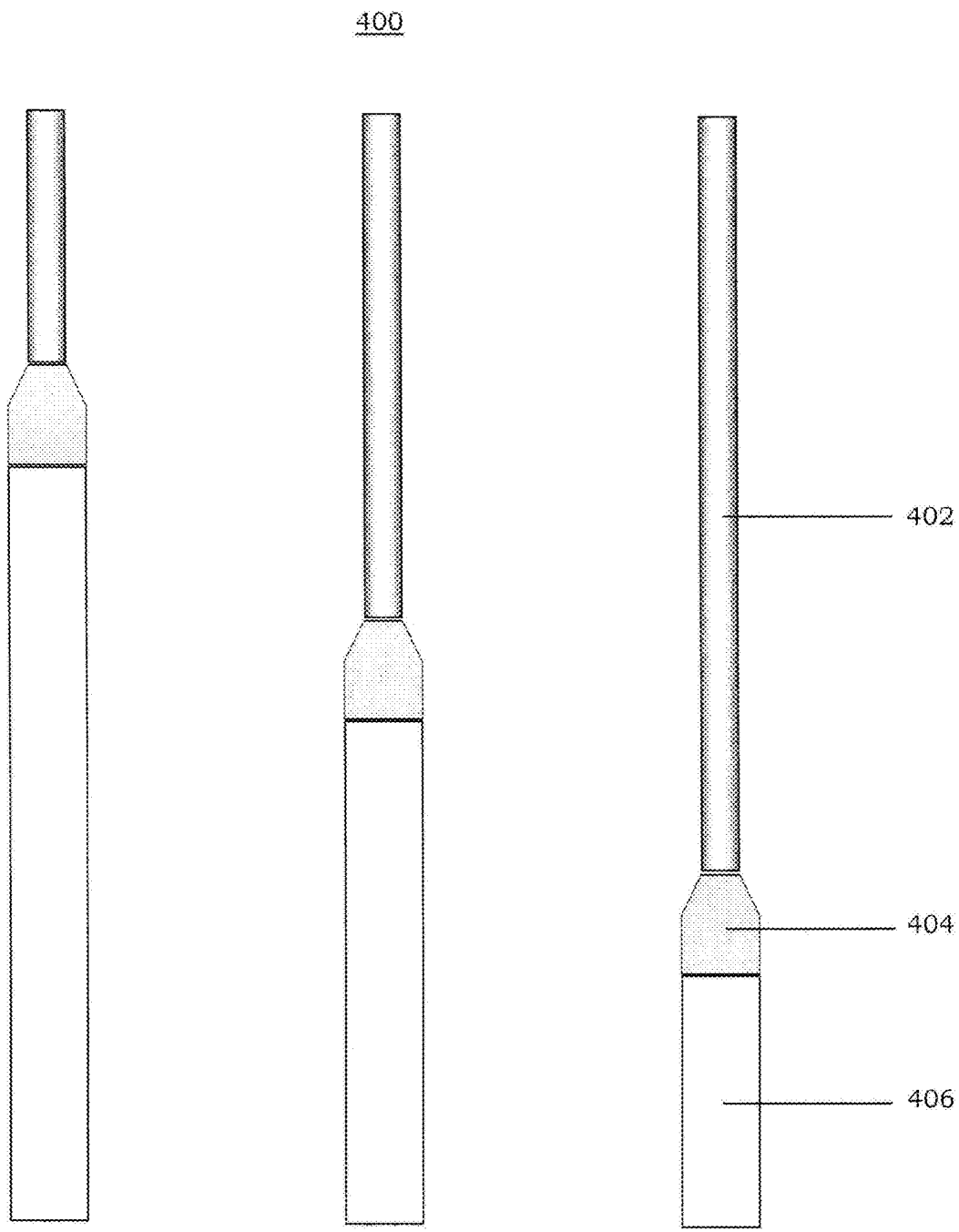
FIG. 4 is a schematic view of moderating fuel rods for a fuel bundle of a boiling water reactor according to another example embodiment.

FIG. 4 is a schematic view of moderating fuel rods for a fuel bundle of a boiling water reactor according to another example embodiment. Referring to FIG. 4, each of the moderating fuel rods 400 includes a neutron moderator section 402, a nuclear fuel section 406, and a threaded connector 404 joining the neutron moderator section 402 and the nuclear fuel section 406. As shown in FIG. 4, an average diameter of the neutron moderator section 402 is less than an average diameter of the nuclear fuel section 406.

As a result, the threaded connector 404 has a portion that expands downward from the neutron moderator section 402 toward the nuclear fuel section 406. The features of the moderating fuel rods 400 of FIG. 4 that correspond to the features of the moderating fuel rods 200 of FIG. 2 and the moderating fuel rods 300 of FIG. 3 (along with the applicable properties, variations, and considerations) may be as described above and, thus, have not been repeated in the interest of brevity.

Figure 5:
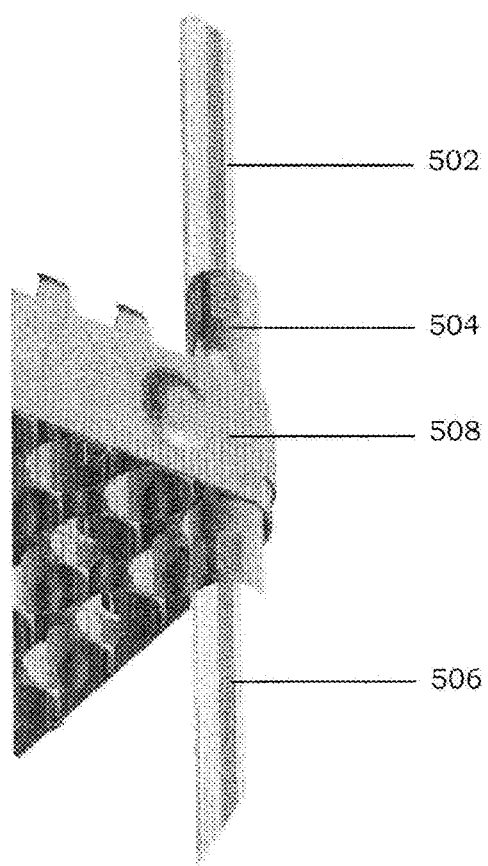
FIG. 5 is a partial view of a moderating fuel rod positioned within a spacer grid of a fuel bundle of a boiling water reactor according to an example embodiment.

FIG. 5 is a partial view of a moderating fuel rod positioned within a spacer grid of a fuel bundle of a boiling water reactor according to an example embodiment. Referring to FIG. 5, a moderating fuel rod includes a neutron moderator section 502, a nuclear fuel section 506, and a threaded connector 504 joining the neutron moderator section 502 and the nuclear fuel section 506. The moderating fuel rod is positioned within an opening of a spacer grid 508 of a fuel bundle. Although only the moderating fuel rod is shown (for simplicity) in the partial view depicted by FIG. 5, it should be understood that other rods (e.g., regular fuel rods, moderating fuel rods) typically occupy the other openings in the spacer grid 508 during the regular operation of the nuclear reactor.

The spacer grid 508 is configured to laterally support the moderating fuel rod (and other rods in the fuel bundle) so as to, for instance, maintain the proper spacing between the array of rods in the fuel bundle. The moderating fuel rod is positioned such that the threaded connector 504 is within the spacer grid 508. In particular, the moderating fuel rod is positioned such that the threaded connector 504 extends from both the top and the bottom of the spacer grid 508. Thus, the moderating fuel rod will only physically contact the spacer grid 508 via the threaded connector 504 (and not via the neutron moderator section 502 or the nuclear fuel section 506). As a result, fretting concerns caused by repeated contacts (e.g., from vibrations) between the moderating fuel rod and the spacer grid 508 (which can lead to loss of material, such as the metal hydride within the neutron moderator section 502) can be mitigated.

When the fuel bundle includes a plurality of spacer grids (e.g., FIG. 1), the moderating fuel rods may include a plurality of threaded connectors positioned to coincide with each of the plurality of spacer grids to mitigate fretting concerns. For instance, using the moderating fuel rods 200 in FIG. 2 as an example, an additional threaded connector (of appropriate dimensions) may be provided above the neutron moderator section 202 in order to join another neutron moderator section to the structure shown. Also, it should be understood that a moderating fuel rod may not need to include a nuclear fuel section in certain situations. Thus, a moderating fuel rod may just include one or more neutron moderator sections and one or more threaded connectors as needed. However, it should be understood that other variations are possible depending on the configuration needed for a specific case.

Additionally, as previously noted, the dimensions of the neutron moderator section 502, the threaded connector 504, and the nuclear fuel section 506 may vary depending on the moderation goals/requirements of the fuel bundle. Furthermore, although the moderating fuel rod is shown in FIG. 5 with the neutron moderator section 502 being above the nuclear fuel section 506, it should be understood that the neutron moderator section 502 can also be positioned below the nuclear fuel section 506 depending on the moderation goals/requirements of a specific case.

Figure 6:
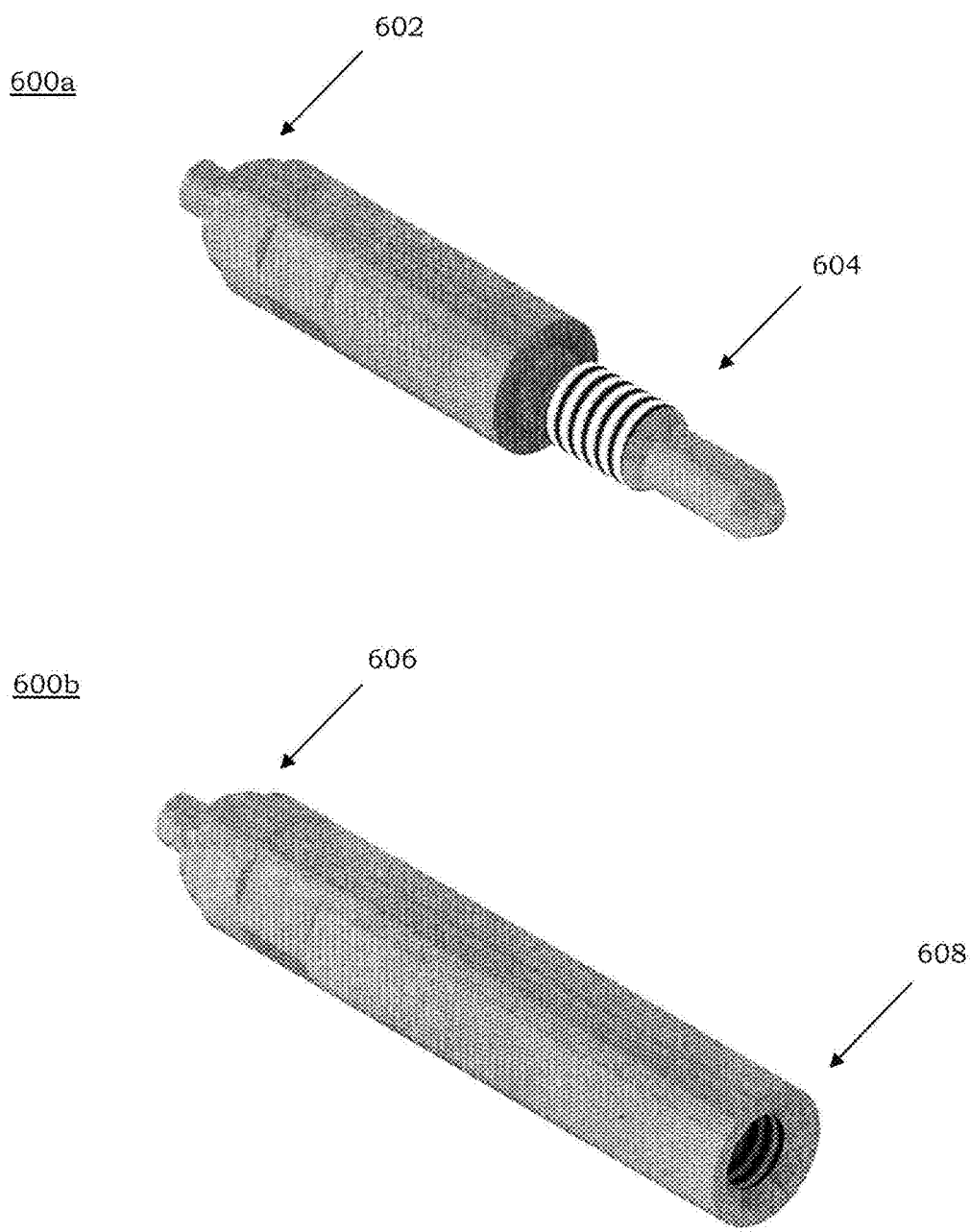
FIG. 6 is a perspective view of a threaded connector of a moderating fuel rod according to an example embodiment.

FIG. 6 is a perspective view of a threaded connector of a moderating fuel rod according to an example embodiment. Referring to FIG. 6, the threaded connector includes a male connector 600a and a female connector 600b. In particular, the combination of the male connector 600a and the female connector 600b (e.g., when united via their threaded portions) may be collectively referred to as the threaded connector. The male connector 600a includes a non-threaded end 602 and an externally-threaded end 604. The female connector 600b includes a non-threaded end 606 and an internally-threaded end 608. The externally-threaded end 604 of the male connector 600a is configured to mate with the internally-threaded end 608 of the female connector 600b.

In an example embodiment, the male connector 600a is connected to one of the nuclear fuel section and the neutron moderator section, while the female connector 600b is connected to the other of the nuclear fuel section and the neutron moderator section. In particular, the connection (e.g., welding) of the male connector 600a to one of the nuclear fuel section and the neutron moderator section is via the non-threaded end 602. Similarly, the connection (e.g., welding) of the female connector 600b to the other of the nuclear fuel section and the neutron moderator section is via the non-threaded end 606. As a result, the externally-threaded end 604 of the male connector 600a is free to mate with the internally-threaded end 608 of the female connector 600b to join the nuclear fuel section and the neutron moderator section.

The neutron moderator section discussed herein may also be structured to include an inner tube within an outer tube to form a double-lined/double-walled pressure boundary to further mitigate fretting concerns and the potential loss of the contents therein. A metal hydride may be contained within the inner tube as a moderator material. In such an example embodiment, the outer tube of the neutron moderator section may be welded to the non-threaded end 602 of the male connector 600a (or the non-threaded end 606 of the female connector 600b), and the inner tube is arranged within the outer tube.

In view of the structures discussed above, a method of moderating a fuel bundle of a boiling water reactor may include inserting at least one moderating fuel rod into the fuel bundle. The at least one moderating fuel rod may include a nuclear fuel section, a neutron moderator section including a metal hydride, and a threaded connector joining the nuclear fuel section and the neutron moderator section. The method may additionally include configuring the neutron moderator section to include an inner tube within an outer tube (with the metal hydride being contained within the inner tube) to mitigate fretting concerns.

The method may also include laterally supporting the at least one moderating fuel rod with a spacer grid. In particular, the at least one moderating fuel rod may be positioned such that the threaded connector is within the spacer grid. As a result of the threaded connector coinciding with the spacer grid, fretting concerns may be further mitigated, since the neutron moderator section (and the nuclear fuel section) is distanced from and, thus, will not physically contact the spacer grid.

The method may further include varying at least one of an axial length and an average diameter of the neutron moderator section based on a position of the at least one moderating fuel rod in the fuel bundle. In particular, not only can the axial length or the average diameter of the neutron moderator section be separately varied but also both the axial length and the average diameter of the neutron moderator section can be simultaneously varied in order to achieve the desired level of moderation.

In an example embodiment, the axial length of the neutron moderator section may be longer when the position of the at least one moderating fuel rod is in an interior of the fuel bundle relative to axial lengths of neutron moderator sections of other moderating fuel rods that are at more exterior locations in the fuel bundle. Conversely, the axial length of the neutron moderator section may be shorter when the position of the at least one moderating fuel rod is in an exterior of the fuel bundle relative to axial lengths of neutron moderator sections of other moderating fuel rods that are at more interior locations in the fuel bundle.

In another example embodiment, the average diameter of the neutron moderator section may be larger when the position of the at least one moderating fuel rod is in an interior of the fuel bundle relative to average diameters of neutron moderator sections of other moderating fuel rods that are at more exterior locations in the fuel bundle. Conversely, the average diameter of the neutron moderator section may be smaller when the position of the at least one moderating fuel rod is in an exterior of the fuel bundle relative to average diameters of neutron moderator sections of other moderating fuel rods that are at more interior locations in the fuel bundle.

In particular, using FIG. 1 as an example, the fuel rods 104 in the fuel bundle 100 are arranged in an array of evenly spaced rows. The longitudinal axis of the fuel bundle 100 extends vertically through the center of the fuel bundle 100, with the fuel rods 104 being generally parallel thereto. Fuel rods that are closer to the central longitudinal axis of the fuel bundle 100 than the sidewalls of the fuel bundle 100 may be regarded as being in the interior. Conversely, fuel rods that are closer to the sidewalls of the fuel bundle 100 than the central longitudinal axis of the fuel bundle 100 may be regarded as being in the exterior. Also, given two fuel rods, the one closer to the longitudinal axis will be regarded as being more interior than the other. Conversely, the one farther from the longitudinal axis will be regarded as being more exterior than the other. However, fuels rods within the same ring (e.g., outermost row of fuel rods forms a square-shaped ring) may be regarded as being in the same spacial locale (e.g., in the exterior) even though one fuel rod in the same ring may technically be closer/farther than another to the longitudinal axis of the fuel bundle 100.

Referring back to FIG. 2, the left moderating fuel rod may be arranged in a more exterior location in the fuel bundle than the center moderating fuel rod. Additionally, the right moderating fuel rod in FIG. 2 may be arranged in a more interior location than the left or center moderating fuel rods. A similar arrangement is also applicable to the moderating fuel rods in FIGS. 3-4.

As for the moderating fuel rods in FIGS. 2-4 relative to each other, a moderating fuel rod 300 in FIG. 3 may be arranged in a more exterior location in the fuel bundle than a corresponding moderating fuel rod 200 in FIG. 2. Additionally, a moderating fuel rod 400 in FIG. 4 may be arranged in a more exterior location in the fuel bundle than a corresponding moderating fuel rod 200 in FIG. 2 or a corresponding moderating fuel rod 300 in FIG. 3.

As a result of the moderating fuel rods and the associated methods herein, the neutron moderation within a fuel bundle may be improved, thereby allowing energy to be more efficiently extracted from the entire length of the fuel bundle. Consequently, water carrying structures (e.g., water rods) that were conventionally used for moderation may also be eliminated, which frees up additional space for more fuel to be loaded into the fuel bundle.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of moderating a fuel bundle of a boiling water reactor, comprising:
    inserting at least one moderating fuel rod into the fuel bundle, the at least one moderating fuel rod including a nuclear fuel section, a neutron moderator section including a metal hydride, and a threaded connector joining the nuclear fuel section and the neutron moderator section;
    wherein an average diameter of the neutron moderator section is different when a position of the at least one moderating fuel rod is in an interior of the fuel bundle as compared to an average diameter of the neutron moderating section of a moderating fuel rod at a more exterior location in the fuel bundle.

2. The method of claim 1, further comprising:
    configuring the neutron moderator section to include an inner tube within an outer tube, the metal hydride being contained within the inner tube.

3. The method of claim 1, further comprising:
    laterally supporting the at least one moderating fuel rod with a spacer grid, the at least one moderating fuel rod being positioned such that the threaded connector is within the spacer grid.

4. The method of claim 1, further comprising:
    varying an axial length of the neutron moderator section based on the position of the at least one moderating fuel rod in the fuel bundle.

5. The method of claim 4, wherein the axial length of the neutron moderator section is longer when the position of the at least one moderating fuel rod is in an interior of the fuel bundle relative to axial lengths of neutron moderator sections of other moderating fuel rods that are at more exterior locations in the fuel bundle.

6. The method of claim 4, wherein the axial length of the neutron moderator section is shorter when the position of the at least one moderating fuel rod is in an exterior of the fuel bundle relative to axial lengths of neutron moderator sections of other moderating fuel rods that are at more interior locations in the fuel bundle.

7. The method of claim 4, wherein the average diameter of the neutron moderator section is larger when the position of the at least one moderating fuel rod is in an interior of the fuel bundle relative to average diameters of neutron moderator sections of other moderating fuel rods that are at more exterior locations in the fuel bundle.

8. The method of claim 4, wherein the average diameter of the neutron moderator section is smaller when the position of the at least one moderating fuel rod is in an exterior of the fuel bundle relative to average diameters of neutron moderator sections of other moderating fuel rods that are at more interior locations in the fuel bundle.

* * * * *